United States Patent Office 3,798,262
Patented Mar. 19, 1974

3,798,262
SULFONYLBENZENESULFONIC ACIDS
Carl Ziegler, Glenside, and James M. Sprague, Gwynedd Valley, Pa., assignors to Merck & Co., Inc., Rahway, N.J.
No Drawing. Filed Dec. 9, 1969, Ser. No. 883,617
Int. Cl. C07c 143/24
U.S. Cl. 260—505 R       1 Claim

ABSTRACT OF THE DISCLOSURE

Sulfonylbenzenesulfonic acids and salts and esters thereof wherein the benzene ring may be substituted by halo, alkyl, trihalomethyl, nitro, carboxy or a hydrocarbylene moiety. The products are prepared by treating a sulfonylbenzenesulfonyl halide with water and are useful as uricosuric agents in the treatment of gout and gouty arthritis.

---

This invention relates to a new class of chemical compounds which can be described generally as sulfonylbenzenesulfonic acids and the salts and ester derivatives thereof. It is also an object of this invention to describe novel methods for the preparation of the substituted sulfonylbenzenesulfonic acids.

Pharmacological studies show that the instant products are effective uricosuric agents which can be used in the treatment of gout and gouty arthritis by increasing the excretion of uric acid by the kidney. The instant products are also a valuable adjuvant for inhibiting excretion of penicillin, thus maintaining high antibiotic levels in the treatment of conditions that require intensive penicillin therapy.

The sulfonylbenzenesulfonic acids of this invention are compounds having the following structural formula:

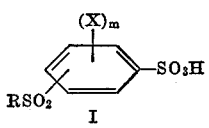

wherein R is alkyl, for example, straight or branched chain alkyl such as n-butyl, pentyl, hexyl, heptyl, 4-heptyl, octyl, 2,6-dimethyloctyl and the like, cycloalkyl, for example, mononuclear cycloalkyls containing from 5 to 6 nuclear carbon atoms such as cyclopentyl, cyclohexyl and the like, cycloalkylalkyl, for example, mononuclear cycloalkyl lower alkyl such as cyclohexylmethyl, 1-cyclohexylethyl and the like, alkenyl such as 2-butenyl and the like, alkynyl such as 2-butynyl and the like, aralkly, for example, mononuclear aralkyl such as benzyl and the like, a primary or secondary amino radical of the formula: —N(R¹)R² wherein R¹ is hydrogen, alkyl, for example, lower alkyl such as ethyl, n-propyl, n-butyl, pentyl, hexyl and the like or cycloalkyl, for example, a mononuclear cycloalkyl containing from 5 to 6 nuclear carbon atoms, such as cyclopentyl, cyclohexyl and the like; R² is alkyl, for example, lower alkyl such as ethyl, n-propyl, n-butyl, pentyl, hexyl and the like or cycloalkyl, for example, a mononuclear cycloalkyl containing from 5 to 6 nuclear carbon atoms such as cyclopentyl, cyclohexyl and the like, or R¹ and R² may be joined, together with the nitrogen to which they are attached, to form a saturated 5- or 6-membered heterocyclic ring such as 1-pyrrolidinyl, morpholino, piperidino and the like; X is hydrogen, halo, for example, bromo, chloro, fluoro and the like, lower alkyl such as methyl and the like, nitro, trihalomethyl such as trifluoromethyl and the like, or carboxy or two X radicals, on adjacent carbon atoms of the benzene ring, may be joined to form a hydrocarbylene chain containing 3 or 4 carbon atoms between their points of attachment, for example, trimethylene, tetramethylene or 1,3-butadienylene (i.e., $$-CH=CH-CH=CH-)$$

and the like and m is an integer having a value of 1–4 and the non-toxic, pharmaceutically acceptable salts, i.e., the salts with non-toxic pharmaceutically acceptable cations, for example, those derived from an alkali metal or alkaline earth metal as, for example, the alkali metal and alkaline earth metal carbonates and hydroxides such as sodium carbonate, sodium hydroxide, magnesium carbonate, calcium hydroxide, potassium hydroxide and the like, ammonia, secondary amines, for example, dialkylamines or heterocyclic amines such as dimethylamine, diethylamine, piperidine, pyrrolidine, pyridine, morpholine and the like.

A preferred embodiment of this invention relates to the substituted sulfonylbenzenesulfonic acids having the following structural formula:

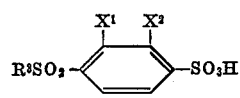

wherein R³ is an alkyl radical, for example, a straight or branched alkyl radical such as n-butyl, pentyl, hexyl, heptyl, 4-heptyl, octyl and the like or a primary or secondary amino radical of the formula: —N(R⁴)R⁵ where R⁴ and R⁵ are the same or different lower alkyl radicals selected from methyl, ethyl, n-propyl, n-butyl, pentyl and the like and X¹ and X² are the same or different substituents selected from hdrogen, halo or trihalomethyl and to the non-toxic, pharmaceutically acceptable salts such as the ammonium salt, sodium salt and the like. This class of compounds exhibits particularly good uricosuric activity and represents a preferred subgroup of compounds within the scope of this invention.

The sulfonylbenzenesulfonic acids (I, supra) of this invention are conveniently prepared by hydrolyzing a corresponding sulfonylbenzenesulfonyl halide with an aqueous medium as, for example, with water. The reaction is generally conducted at a temperature in the range of from 15° C. to 100° C. Solvents which may be employed in the reaction include water and water miscible solvents such as acetone, dioxane, acetonitrile, dimethylformamide, dimethylsulfoxide, tetrahydrofuran and the like. The following equation illustrates this process:

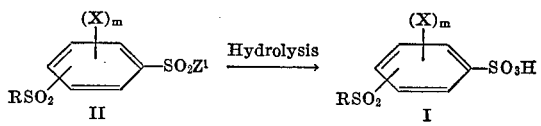

wherein R, X and m are as defined above and $Z^1$ is halo such as bromo, chloro, fluoro and the like.

The sulfonylbenzenesulfonic acids are generally isolated as their salts by treating the sulfonylbenzenesulfonic acid with a suitable base. Bases which may be employed in this reaction are the bases derived from the alkali metal and alkaline earth metals and include the hydroxides, carbonates, alkoxides and hydrides such as sodium hydroxide, potassium hydroxide, calcium hydroxide, sodium carbonate, potassium carbonate, sodium ethoxide, sodium hydride and the like. Also included are the organic nitrogen bases such as ammonia, primary amines, secondary amines, for example, mono- and di-alkylamines including mono- or di-lower alkylamines such as monomethylamine, dimethylamine, diethylamine and the like and heterocyclic amines such as piperidine and the like. Any solvent which is substantially inert to the reactants employed may be used such as water, alkanols, for example, the lower alkanols such as methanols, ethanol and the like, hydrocarbon solvents such as benzene and the like. The reaction of a sulfonylbenzenesulfonic acid with an inorganic nitrogen base is conveniently conducted by employing as the solvent an excess of the same amine employed as the reactant.

The sulfonylbenzenesulfonyl halides (II, supra) are prepared by the diazotization of a sulfonylaniline (III, infra) followed by treating the intermediate diazonium salt with sulfur dioxide and a cuprous halide, such as cuprous chloride, cuprous bromide, cuprous fluoride and the like. The diazotization is conducted by dissolving the sulfonylaniline in a solution of glacial acetic acid and an inorganic acid such as concentrated hydrochloric acid, fluoroboric acid and the like followed by treatment with an aqueous solution of sodium nitrite. The resulting diazonium salt of the sulfonylaniline is then treated with sulfur dioxide and a cuprous halide in water. The reaction may be conducted at temperature from about 0° C. to 25° C., but it is preferred to conduct the process at 0 to 5° C. The following equation illustrates this process:

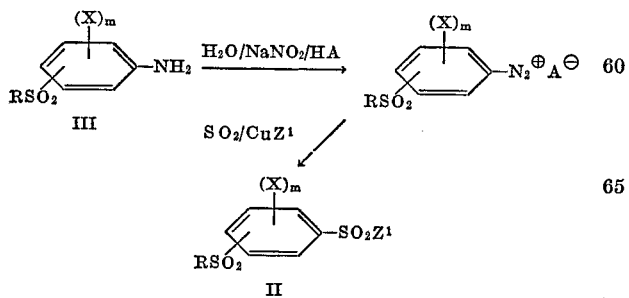

wherein R, X, $Z^1$ and m are as defined above, HA is an inorganicacid such as hydrochloric, fluoroboric acid and the like and $A^\ominus$ is a halo anion such as a chloro anion and the like or a fluoboro anion.

The sulfonylanilines (III, supra) may be prepared by hydrolyzing an appropriate N-lower alkanoyl(sulfonyl)-aniline (IV, infra), preferably, with an aqueous solution of an inorganic acid such as hydrochloric acid and the like or, alternatively, with an aqueous solution of a base as, for example, an alkali metal hydroxide such as sodium hydroxide, potassium hydroxide and the like. The following equation illustrates this process:

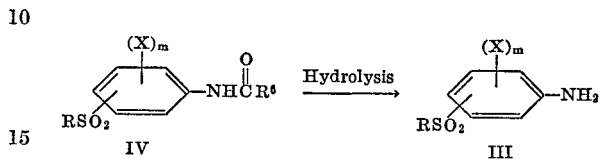

wherein R, X and m are as defined above and $R^6$ is lower alkyl such as methyl, ethyl, n-propyl and the like.

The N-lower alkanoyl(sulfonyl)anilines (IV) are conveniently prepared by either one of two methods. The method employed is dependent upon the nature of the R group desired in the N-lower alkanoyl(sulfonyl)aniline (IV). One method, wherein R in Formula IV is alkyl, cycloalkyl, cycloalkylalkyl, alkenyl, alkynyl or aralkyl, comprises the oxidation of the corresponding substituted N-lower alkanoylthio(or sulfinyl)aniline (VI, infra). The second method, wherein R is a primary or secondary amino radical, comprises treating an N-lower alkanamido substituted benzenesulfonylhalide (VII, infra) with a primary or secondary amine.

The N-lower alkanoyl(sulfonyl)anilines (IVa) of this invention wherein $R^7$ is alkyl, cycloalkyl, cycloalkylalkyl, alkenyl, alkynyl or aralkyl are conveniently prepared by treating the corresponding nuclear thio substituted N-lower alkanoyl aniline (VI, infra) with an oxidizing agent such as hydrogen peroxide, chromium trioxide, potassium permanganate and the like. It should be noted that the reaction is a two-step process which proceeds through the formation of an N-lower alkanoyl(sulfinyl)aniline (V, infra) which product may be isolated by employing initially only a stoichiometric amount of the oxidizing agent and then completing the oxidation to the desired N-lower alkanoyl(sulfonyl)aniline (IVa, infra) by the addition of a molar excess of the particular oxidizing agent employed. However, in general, it is usually advantageous to conduct the reaction without isolating the N-lower alkanoyl(sulfinyl)aniline intermediate (V) by initially treating the nuclear thio substituted N-lower alkanoyl aniline (VI) with an excess of the particular oxidizing agent employed. Any solvent in which the reactants are reasonably soluble and which are substantially inert may be employed as the reaction medium. Such suitable diluents include, for example, acetic acid, acetone and the like. While the reactions may be conducted at a temperature in the range of from about 0° C. to about 100° C., we have found it convenient to conduct the reactions in an ice bath at about 0° C. The following equation illustrates this process:

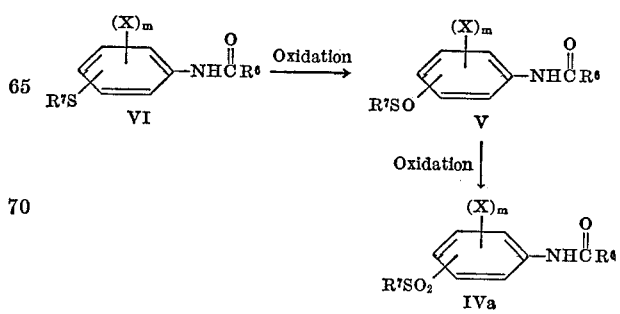

wherein $R^6$, $R^7$, X and m are as defined above.

The second method for preparing the N-lower alkanoyl-mono- or di-substituted sulfamoylanilines (IVb, infra) comprises the reaction of an N-lower alkanamidobenzenesulfonyl halide (VII, infra) with a suitable amine such as a mono- or di-substituted alkylamine, including a mono- or di-substituted lower alkalamine, such as mono- or diethylamine, mono- or di-n-propylamine, mono- or di-n-butylamine, mono- or dipentylamine, mono- or dihexylamine and the like or a heterocyclic amine such as pyrrolidine, morpholine, piperidine and the like. Any solvent which is substantially inert to the reactants may be employed, for example, acetone, benzene, pyridine and the like; however, we have found it convenient to use as the solvent an excess of the same amine which is employed as the starting material in the process. While the temperature at which the reaction is conducted is not critical, it is most desirable to conduct the process at a temperature of from about 25° C. to 100° C. The following equation illustrates this process:

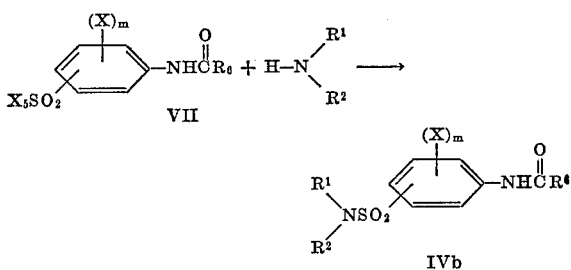

wherein $R^1$, $R^2$, $R^6$, X and $m$ are as defined above; $X^5$ is halo such as bromo, chloro, fluoro and the like.

The N-lower alkanoyl(substituted thio)anilines (VI, infra) are conveniently prepared by treating an alkali metal derivative of an N-lower alkanoyl aniline (VIII, infra) with a compound of the formula: $X^5R^7$ wherein $R^7$ and $X^5$ are as defined above. Any solvent in which the reactants are soluble and which are inert to the reactants employed may be used, such as ethanol, benzene, toluene and the like. While the temperature at which the reaction is conducted is not a particularly critical aspect of this invention, it is convenient to conduct the reaction at temperatures ranging from ambient temperature up to the reflux temperature of the particular solvent employed. The following equation illustrates this process:

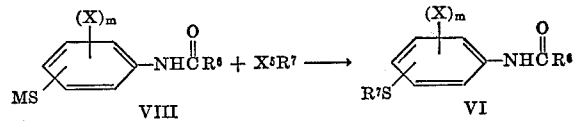

wherein $R^6$, $R^7$, X, $X^5$ and $m$ are as defined above and M is a cation derived from an alkali metal such as sodium and the like.

The alkali metal salts of the N-lower alkanoyl anilines (VIII, supra) employed in the preparation of the N-lower alkanoyl(substituted thio)anilines (VI, supra) are conveniently prepared by treating the corresponding N-lower alkanoyl(mercapto)aniline (IX, infra) with a base such as an alkali metal alkoxide or an alkali metal hydride such as sodium ethoxide, sodium hydride and the like. When an alkoxide is employed, we have found it convenient to employ, as a solvent, an alkanol which corresponds to the alkoxide portion of the alkali metal alkoxide, whereas, when an alkali metal hydride is employed hydrocarbon solvents such as benzene, toluene and the like may be employed. This reaction is conveniently conducted at the reflux temperature of the particular solvent employed. The following equation illustrates this process:

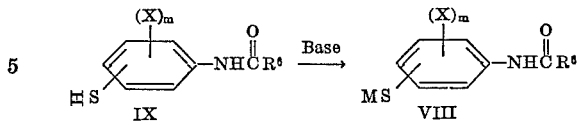

wherein $R^6$, M, X and $m$ are as defined above.

The N-lower alkanoyl(mercapto)anilines (IX, supra) employed in the preparation of the alkali metal salts of the N-lower alkanoyl(mercapto)anilines (VIII, supra) are either known compounds or are prepared by treating a suitable N-lower alkanamidobenzenesulfonyl halide (VII, infra) with a reducing agent such as zinc amalgam, zinc dust or stannous chloride. The reaction is preferably conducted in an aqueous solution of a mineral acid such as hydrochloric acid, sulfuric acid and the like or in a lower alkanoic acid such as acetic acid and the like. The following equation illustrates this process:

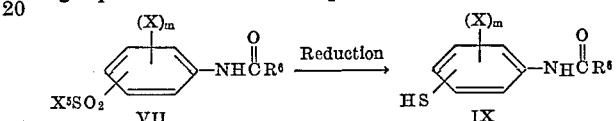

wherein $R^6$, X, $X^5$ and $m$ are as defined above.

The N-lower alkanamido benzenesulfonyl halides (VII, supra) employed as starting materials in the preparation of the N-lower alkanoyl mono- or di-substituted sulfamoylanilines (IVb, supra) are either known compounds or may be prepared by treating the corresponding anilide (X, infra) with a halosulfonic acid such as chlorosulfonic acid, fluorosulfonic acid and the like. This reaction is conducted by adding the anilide to the halosulfonic acid at room temperature and when the addition is complete, warming the reaction mixture to complete the reaction. The following equation illustrates this process:

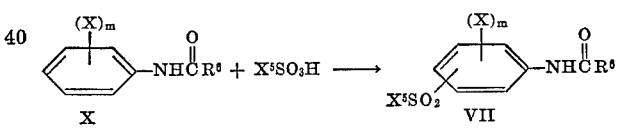

wherein $R^6$, X, $X^5$ and $m$ are as defined above.

Included within the scope of this invention are the non-toxic, pharmaceutically acceptable salts of the instant products. In general, any base which will form a salt with the sulfonylbenzenesulfonic acids and whose pharmacological properties will not cause an adverse physiological effect when ingested by the body system, is considered as being within the scope of this invention. Suitable bases for preparing the salts include, for example, the alkali metal and alkaline earth metal hydroxides, carbonates, metal hydrides and alkoxides, ammonia, primary amines, for example, dialkylamine or heterocyclic amines such as dimethylamine, diethylamine or pyridine, pyrrolidine, piperidine, morpholine, and the like.

Also included within the scope of this invention are the esters of the instant products. Thus, for example, the ester derivatives may be prepared by the reaction of a sulfonylbenzenesulfonyl halide of this invention with an alcohol as, for example, the lower alkanol such as methanol, ethanol and the like, lower alkanamido lower alkanols such as 2-acetamidoethanol and the like, benzamido substituted lower alkanols such as 1- or 2-benzamidoethanol and the like.

The foregoing and other equivalent methods for the preparation of the salts and ester derivatives of the instant products will be apparent to those having ordinary skill in the art and, to the extent that said derivatives are both non-toxic and physiologically acceptable to the body system, said salts and esters are the functional equivalent of the sulfonylbenzenesulfonic acids (I).

The examples which follow illustrate the sulfonylbenzenesulfonic acids of this invention and the method by which they may be prepared. However, it should be understood that the examples are illustrative only and it will be apparent to those having ordinary skill in the art that all of the products embraced by Formula I, supra, may also be prepared in an analogous manner by substituting the appropriate starting materials for those set forth in the following examples.

EXAMPLE 1

4-di-n-propylsulfamoylbenzenesulfonic acid and ammonium salt

Step A: N-acetylsulfanilyl chloride.—To a cooled solution (12°–15° C.) of chlorosulfonic acid (290.0 g., 2.49 moles) is slowly added acetanilide (67.5 g., 0.5 mole). After the addition is complete the mixture is heated to 60° C. for two hours. The reaction mixture is poured into 1 kg. of ice. The crude N-acetylsulfanilyl chloride is collected on a suction funnel and washed with water. Recrystallization from benzene affords substantially pure N-acetylsulfanilyl chloride, M.P. 149° C.

Step B: $N^1,N^1$-di-n-propylsulfanilamide.—To a chilled solution of di-n-propylamine (70 g.) in pyridine (150 ml.) is added N-acetylsulfanilyl chloride (60 g.) in portions and with good stirring. After the addition is complete, the reaction mixture is warmed on the steam bath for 3 hours. The excess pyridine and di-n-propylamine are removed under reduced pressure to yield crude $N^4$-acetyl-$N^1,N^1$-di-n-propylsulfanilamide as a thick brown oil. A mixture of ethanol (150 ml.), water (250 ml.) and concentrated hydrochloric acid (250 ml.) is added and the reaction mixture heated on the steam bath for 3 hours. The excess ethanol is removed, the reaction mixture cooled and a 40% solution of sodium hydroxide is added until the reaction mixture is basic to afford $N^1,N^1$-di-n-propylsulfanilamide.

Step C: 4-di-n-propylsulfamoylbenzenesulfonyl chloride.—A mixture of $N^1,N^1$-di-n-propylsulfanilamide (30 g.) in acetic acid (100 ml.) and concentrated hydrochloric acid (80 ml.) is cooled to 0° C. in an ice and salt bath and stirred while sodium nitrite (8.4 g.) in water (25 ml.) is added, slowly, dropwise at such a rate that the temperature remains below 5° C. Meanwhile, sulfur dioxide (60 g.) is disolved in acetic acid (125 ml.). To this is added cupric chloride (8.0 g.) in water (15 ml.). When the diazotization reaction is complete, it is added carefully to the sulfur dioxide solution as rapidly as foaming allows. After standing for 2 hours the product is removed by filtration, washed well with water and air dried. There is obtained 35.3 g. of 4-di-n-propylsulfamoylbenzenesulfonyl chloride, M.P. 125°–127° C. The product is recrystallized from acetic acid and water raising the melting point to 126°–128° C.

Elemental analysis.—Calc. for $C_{12}H_{18}ClNO_4S$ (percent): C, 42.41; H, 5.34; N, 4.12. Found (percent): C, 42.30; H, 5.08; N, 4.07.

Step D: 4-di-n-propylsulfamoylbenzenesulfonic acid and ammonium salt.—A mixture of 4-di-n-propylsulfamoylbenzenesulfonyl chloride (6 g.), water (100 ml.) and acetone (5 ml.) is heated under reflux on the steam bath. The oily suspension gives way to complete solution after one hour. The solvent is removed under reduced pressure to yield 4-di-n-propylsulfamoylbenzenesulfonic acid as an oil to which about 25 ml. of liquid ammonia is added. When the excess ammonia has evaporated, the residue is dissolved in ethanol (30 ml.) and the product recovered by addition of ether (70 ml.) to afford 4.2 g. of ammonium 4-di-n-propylsulfamoylbenzenesulfonate, M.P. 212°–214° C.

Elemental analysis.—Calc. for $C_{12}H_{22}N_2O_5S_2$ (percent): C, 42.58; H, 6.55; N, 8.28. Found (percent): C, 43.02; H, 6.75; N, 8.21.

EXAMPLE 2

3-chloro-4-di-n-butylsulfamoylbenzenesulfonic acid and ammonium salt

Step A: $N^1,N^1$-di-n-butyl-2-chlorosulfanilamide.—2-chloro-N-acetylsulfanilyl chloride (18 g.) is added carefully to a mixture of di-n-butylamine (26 g.) in acetone 100 ml.). The reaction is warmed for ½ hour and then the solvent removed to yield $N^4$-acetyl-$N^1,N^1$-di-n-butyl-2-chlorosulfanilamide to which is added ethanol (25 ml.) and hydrochloric acid (25 ml.). The resulting solution is heated under reflux for 1½ hours. About ½ of the solvent is removed and then the reaction mixture is cooled and made basic with sodium hydroxide solution to precipitate the crude product which is removed by filtration and recrystallization from a mixture of ether and petroleum ether to afford 15.8 g. of $N^1,N^1$-di-n-butyl-2-chlorosulfanilamide, M.P. 107°–109° C.

Elemental analysis.—Calc. for $C_{14}H_{23}ClN_2O_2S$ (percent): C, 52.73; H, 7.27; N, 8.79. Found (percent): C, 52.80; H, 6.95; N, 8.70.

Step B: 3-chloro-4-di-n-butylsulfamoylbenzenesulfonyl chloride.—A solution of $N^1,N^1$-din-butyl-2-chlorosulfanilamide (11 g.) in glacial acetic acid (50 ml.) and concentrated hydrochloric acid (25 ml.) is converted to the diazonium salt by treatment with a solution of sodium nitrite (2.5 g.) in water (5 ml.). A solution of sulfur dioxide (25 g.) in glacial acetic acid (50 ml.) is prepared to which is added a solution of cupric chloride (2 g.) in water (5 ml.). When the above reactions have been completed, the diazonium salt is added carefully to the sulfur dioxide solution. After 2 hours, ice water is added to precipitate the 3-chloro-4-di-n-butylsulfamoylbenzenesulfonyl chloride. The crude product is dissolved in ether and precipitated with petroleum ether to yield 11.6 g. of 3-chloro-4-di-n-butylsulfamoylbenzenesulfonyl chloride, M.P. 62°–64° C.

Step C: 3-chloro-4-di-n-butylsulfamoylbenzenesulfonic acid and ammonium salt.—A mixture of 3-chloro-4-dibutylsulfamoylbenzenesulfonyl chloride (4 g.), ethanol (50 ml.) and hydrochloric acid (50 ml.) is heated 4 hours under reflux. After removal of the solvent, the 3-chloro-4-di-n-butylsulfamoylbenzenesulfonic acid is treated with ammonia and recrystallized from a mixture of alcohol, ether and petroleum ether to afford 2 g. of ammonium 3-chloro-4-di-n-butylsulfamoylbenzenesulfonate, M.P. 202°–204° C.

Elemental analysis.—Calc. for $C_{14}H_{25}ClN_2O_5S_2$ (percent): C, 41.94; H, 6.25; N, 6.99. Found (percent): C, 42.15; H, 6.20; N, 6.81.

EXAMPLE 3

4-(4-heptylsulfonyl)benzenesulfonic acid and ammonium salt

Step A: N-acetylsulfanilyl chloride.—To a cooled solution (12°–15° C.) of chlorosulfonic acid (290.0 g., 2.49 moles) is slowly added acetanilide (67.5 g., 0.5 mole). After the addition is complete the mixture is heated to 60° C. for two hours. The reaction mixture is poured into 1 kg. of ice. The crude N-acetylsulfanilyl chloride is collected on a suction funnel and washed with water. Recrystallization from benzene affords substantially pure N-acetylsulfanilyl chloride, M.P. 149° C.

Step B: 4-acetamidothiophenol.—To a suspension of N-acetylsulfanilyl chloride (58.5 g., 0.25 mole) in sulfuric acid (concentrated, 300 ml.) and water (600 ml.) is added zinc amalgam. [The zinc amalgam is prepared by dissolving mercuric chloride (28.0 g.) in a solution of water (200 ml.) and concentrated hydrochloric acid (20 ml.) followed by the addition of zinc dust (150.0 g., 2.3 moles). The reaction mixture is stirred for ¼ hour and then the zinc amalgam is collected by filtration. The zinc amalgam is washed successively with water, ethanol and finally ether.] Benzene (300 ml.) is added to the reaction mixture and the reaction mixture is refluxed, on a steam bath, for 1¼ hours. The reaction mixture is cooled and the benzene layer separated from the aqueous phase. The aqueous phase is extracted with four 500 ml. portions of diethyl ether. The benzene layer and the diethyl ether extracts are combined and dried over sodium sulfate, filtered and the solvent removed to afford 4-acetamidophenol, M.P. 150°–153° C.

Step C: 4-(4-heptylthio)acetanilide.—Sodium (9.2 g., 0.4 g. atom) is dissolved in ethanol (40 ml.). To this solution is added 50 g. (0.3 mole) of 4-acetamidothiophenol after which the reaction mixture is heated under reflux for half an hour. 4-bromoheptane (59.2 g.; 0.33 mole) is added as rapidly as reaction would allow. The reaction mixture was then heated for 5 hours. The excess alcohol is removed and water is added to the residue. The oily product is extracted into ether, the extract is dried over sodium sulfate and the crude 4-(4-heptylthio)-acetanilide is distilled. The fraction that boiled between 170° and 175° C. at 0.4 mm. of mercury is collected.

Step D: 4-(4-heptylsulfonyl)acetanilide.—A solution of 27.5 g. (0.104 mole) of 4-(4-heptylthio)acetanilide in a mixture of 125 ml. of glacial acetic acid and 125 ml. of acetic anhydride is cooled to 0° C. and 39 g. (0.39 mole) of 30% hydrogen peroxide is added slowly, dropwise, with good stirring at such a rate that the temperature remains below 5° C. The reaction is allowed to come to room temperature as the ice bath melts. After diluting the reaction with a liter of water, the oily material is extracted into ether and the extract dried over sodium sulfate. The sodium sulfate is removed by filtration and the filtration is concentrated and chilled to afford 4-(4-heptylsulfonyl)acetanilide which after several recrystallizations from ether had a M.P. of 113°–114° C.

Step E: 4-(4-heptylsulfonyl)aniline.—A solution of 4-(4-heptylsulfonyl)acetanilide (45 g.) in ethanol (150 ml.), concentrated hydrochloric acid (100 ml.) and water (100 ml.) is heated under reflux for 48 hours. After concentrating to a small volume on the steam bath, the reaction mixture is diluted to about 2 liters with cold water. The resulting white precipitate is filtered and dried, yielding 36 g. of 4-(4-heptylsulfonyl)aniline, M.P. 140°–141° C. unchanged by recrystallization from ether.

Step F: 4-(4-heptylsulfonyl)benzenesulfonyl chloride.—A slurry of 4-(4-heptylsulfonyl)aniline (8 g., 0.03 mole) in glacial acetic acid (27 ml.) and concentrated hydrochloric acid (22 ml.) is cooled to 0° C. in an ice-salt bath and stirred vigorously while 2.2 g. (0.03 mole) of sodium nitrite in 10 ml. of water is added slowly, dropwise, at such a rate that the temperature never exceeds 5° C. While this is being done, a solution of sulfur dioxide (16.5 g.) in acetic acid (35 ml.) is prepared. To this is added cupric chloride (2.2 g.) in water (6 ml.). Then the diazotization is complete, the reaction mixture is added carefully to the sulfur dioxide solution as fast as foaming allows. After standing for 2 hours, the reaction mixture is diluted to one liter with water and filtered. The residue is air dried to yield 9 g. of crude product, M.P. 96°–99° C. It can be recrystallized from a mixture of ether and petroleum ether to afford pure 4-(4-heptylsulfonyl)benzenesulfonyl chloride, M.P. 102°–103° C.

Step G: 4-(4-heptylsulfonyl)benzenesulfonic acid and ammonium salt.—A mixture of 4-(4-heptylsulfonyl)benzenesulfonyl chloride (6 g.) in water (100 ml.) and acetone (5 ml.) is heated on the steam bath to afford 4-(4-heptylsulfonyl)benzenesulfonic acid upon removal of the solvents. To the acid is then added liquid ammonia (25 ml.). The excess liquid ammonia is allowed to evaporate, the residue is dissolved in ethanol and ether added. The precipitate is collected and dried to afford ammonium 4-(4-heptylsulfonyl)benzenesulfonate, M.P. 215°–216° C.

Elemental analysis.—Calc. for $C_{13}H_{23}NO_5S_2$ (percent): C, 46.27; H, 6.87; N, 4.15. Found (percent): C, 46.75; H, 6.54; N, 4.12.

EXAMPLE 4

4-di-n-butylsulfamoylbenzenesulfonic acid and sodium salt

Step A: $N^1,N^1$-di-n-butylsulfanilamide.—To a chilled solution of di-n-butylamine (70 g.) in pyridine (150 ml.) is added N-acetylsulfanilyl chloride (60 g.) in portions and with good stirring. After the addition is complete, the reaction mixture is warmed on the steam bath for 3 hours. The excess pyridine and dibutylamine are removed under reduced pressure to yield crude $N^4$-acetyl-$N^1,N^1$-di-n-butylsulfanilamide as a thick brown oil. A mixture of ethanol (150 ml.), water (250 ml.) and concentrated hydrochloric acid (250 ml.) is added and the reaction mixture heated on the steam bath for 3 hours. The excess ethanol is removed, the reaction mixture cooled and a 40% solution of sodium hydroxide is added until the reaction mixture is basic. The oil that separates soon crystallizes. Recrystallization from ether-hexane yields 57.8 g. of $N^1,N^1$-di-n-butylsulfanilamide, M.P. 71°–73° C.

Elemental analysis.—Calc. for $C_{14}H_{24}N_2O_2S$ (percent): C, 59.12; H, 8.50; N, 9.85. Found (percent): C, 59.09; H, 8.35; N, 9.74.

Step B: 4 - di - n - butylsulfamoylbenzenesulfonyl chloride.—$N^1,N^1$-di-n-butylsulfanilamide in acetic acid (200 ml.) and concentrated hydrochloric acid (150 ml.) is diazotized with sodium nitrite (14.1 g.) and added carefully to a solution of sulfur dioxide (100 g.) in acetic acid (200 ml.) containing cupric chloride (14 g.). After 2 hours the reaction mixture is filtered to obtain, after drying, 69.5 g. of crude product 4-di-n-butylsulfamoylbenzenesulfonyl chloride. Recrystallization from benzene yields 4 - di - n - butylsulfamoylbenzenesulfonyl chloride, M.P. 124°–126° C.

Elemental Analysis.—Calc. for $C_{14}H_{22}ClNO_4S_2$ (percent): C, 45.72; H, 6.03; N, 3.81. Found (percent): C, 45.88; H, 6.15; N, 3.79.

Step C: 4-di-n-butylsulfamoylbenzenesulfonic acid and sodium salt.—A mixture of 4-di-n-butylsulfamoylbenzenesulfonyl chloride (6.8 g., 0.02 mole), water (100 ml.) and acetone (5 ml.) is heated under reflux on the steam bath for one hour. Removal of the solvent affords 4-di-n-butylsulfamoylbenzenesulfonic acid. A solution of sodium hydroxide (0.8 g., 0.02 mole) in water is then added to the 4-di-n-butylsulfamoylbenzenesulfonic acid. Removal of the solvent yields sodium 4-di-n-butylsulfamoylbenzenesulfonate.

EXAMPLE 5

2-acetamidoethyl 4-di-n-propylsulfamoylbenzenesulfonate 2-acetamidoethanol is added to 4-di-n-propylsulfamoylbenzenesulfonyl chloride at 0° C. The reaction mixture is allowed to come to room temperature. The solvent is removed at reduced pressure and the residue vacuum distilled to yield 2-acetamidoethyl 4-di-n-propylsulfamoylbenzenesulfonate.

EXAMPLE 6

3-chloro-4-(4-heptylsulfonyl)benzenesulfonic acid

Step A: N-acetyl-2-chlorosulfanilyl chloride.—3-chloroacetanilide (0.5 mole) is slowly added to chlorosulfonic acid (330 ml.). After the addition is completed the reaction mixture is heated to 60°–65° C. for 2 hours, the solution is then cooled and poured onto crushed ice to yield crude N-acetyl-2-chlorosulfanilyl chloride, M.P. 138°–140° C.

Step B: 4-acetamido-2-chlorothiophenol.—Sulfuric acid (300 ml., concentrated) is added to cold water (600 ml.) and the solution is cooled to room temperature. A solution of mercuric chloride (28.0 g.) in water (200 ml.) and concentrated hydrochloric acid (20.0 ml.) is prepared. To this solution is added powdered zinc (200.0 g.), with occasional stirring to break up the lumps. The zinc amalgam formed is collected on a suction funnel and washed successively with water, alcohol and ether. A mixture of the zinc amalgam (67.0 g.), N-acetyl-2-chlorosulfanilyl chloride and benzene (300 ml.) is added to the sulfuric acid solution and the mixture is carefully heated under reflux, with good stirring, until the reaction became vigorous. After the initial reaction had subsided, the mixture is heated on the steam bath for 2 hours. The mixture is then cooled and extracted with four 500 ml. portions of ether. The extract is dried over sodium sulfate, filtered and concentraed to a small volume whereupon there is obtained 25 g. of 4-acetamido-2-chlorothiophenol, M.P. 119°–121° C.

*Elemental analysis.*—Calc. for $C_8H_8ClNOS$ (percent): C, 47.64; H, 4.00. Found (percent): C, 48.00; H, 4.80.

Step C: 3-chloro-4-(4-heptylthio)acetanilide.—Sodium (9.2 g., 0.4 g. atom) is dissolved in ethanol (400 ml.). To this solution is added 4-acetamido-2-chlorothiophenol (0.03 ml.), the reaction mixture is then heated under reflux for ½ hour. 4-bromoheptane (59.2 g., 0.33 mole) is added as rapidly as the reaction would allow. The reaction mixture is then heated for 5 hours. The excess ethanol is removed and water is added to the residue. The oily product is extracted into ether. The extract is dried over sodium sulfate. The solution is filtered and the ether is removed to yield 3-chloro-4-(4-heptylthio)acetanilide.

Step D: 3-chloro-3-(4-heptylsulfonyl)acetanilide.—A solution of 3-chloro-4-(4-heptylthio)acetanilide (0.0104 mole) in a mixture of glacial acetic acid (125.0 ml.) and acetic anhydride (125.0 ml.) is cooled to 0° C. and 39 g. (0.39 mole) of 30% hydrogen peroxide is added slowly, dropwise, with good stirring at such a rate that the temperature remains below 5° C. The reaction is allowed to come to room temperature as the ice bath melts. After diluting the reaction with a liter of water, the oily material is extracted into ether and the extract dried over sodium sulfate. The sodium sulfate is removed by filtration and the ether removed to afford 3-chloro-4-(4-heptylsulfonyl)acetanilide, M.P. 95°–97° C., after several recrystallizations from ether.

Step E: 3-chloro-4-(4-heptylsulfonyl)acetanilide (45.0 g.) in ethanol (150 ml.), concentrated hydrochloric acid (100 ml.) and water (100 ml.) is heated under reflux for 48 hours. After concentrating to a small volume on the steam bath, the reaction mixture is diluted to about 2 liters with cold water to afford 3-chloro-4-(4-heptylsulfonyl)aniline, M.P. 178–180° C.

Step F. 3 - chloro-4-(4-heptylsulfonyl)benzenesulfonyl chloride.—By substituting for the 4-(4-heptylsulfonyl) aniline of Example 3, step E, an equimolar quantity of 3-chloro-4-(4-heptylsulfonyl)aniline and by following substantially the procedure described therein, there is obtained 3-chloro - 4 - (4-heptylsulfonyl)benzenesulfonyl chloride.

Step G: 3-chloro-4-(4-heptylsulfonyl)benzenesulfonic acid and ammonium salt.—By substituting for the 4-(4-heptylsulfonyl)benzenesulfonyl chloride of Example 3, step F, an equimolar quantity of 3-chloro-4-(4-heptylsulfonyl)chloride and by following substantially the procedure therein, there is obtained 3-chloro-4-(4-heptylsulfonyl)benzenesulfonic acid. To the acid is added liquid ammonia (25 ml.). The excess ammonia is allowed to evaporate to afford ammonium 3-chloro-4-(4-heptylsulfonyl)benzenesulfonate.

By following substantially the procedure described in Example 1 or Example 3, all of the products (I) of this invention may be prepared. Thus, by substituting the appropriately substituted acetanilide for the acetanilide of Examples 1 and 3, step A, and by following substantially the procedure as described in Example 1, steps A through D or Example 3, steps A through G, the sulfonylbenzoic acids (I) of this invention may be obtained. The following equation illustrates the reactions of Examples 1 and 3 and, together with Table I, depict the intermediates and the sulfonylbenzoic acids obtained thereby.

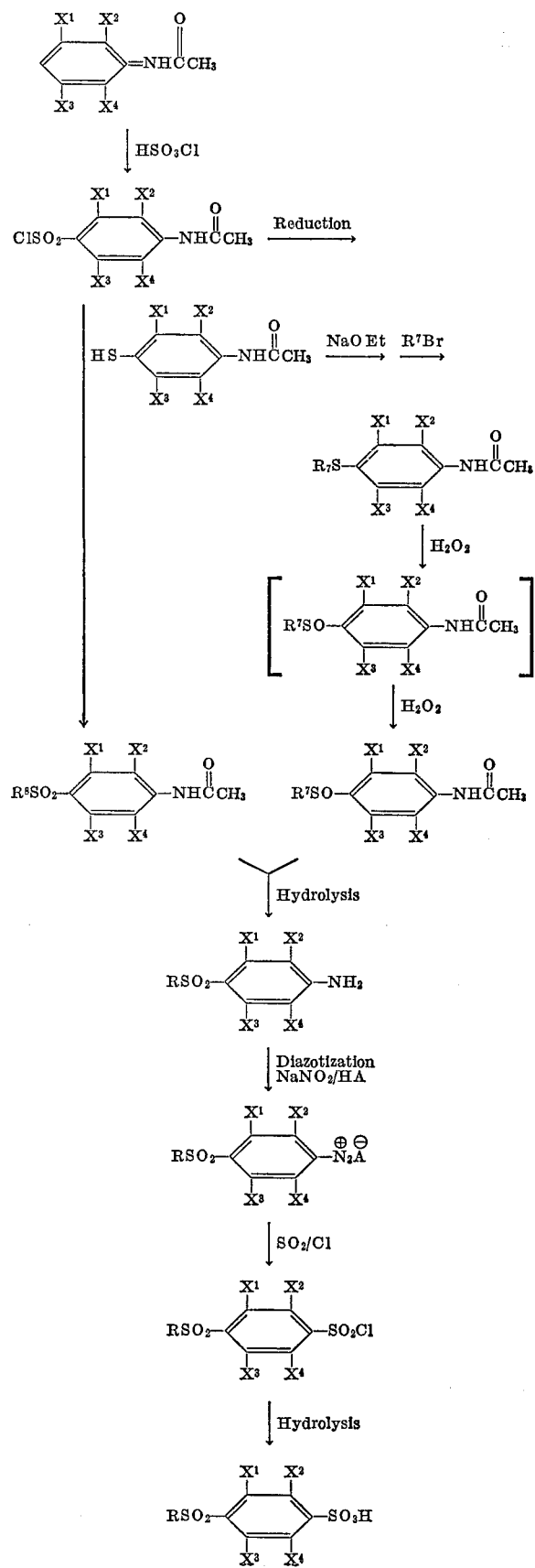

TABLE I

| Example | X¹ | X² | X³ | X⁴ | R — R⁷ | R — R⁸ | Method of Example |
|---|---|---|---|---|---|---|---|
| 7 | —CF₃ | H | H | H |  | —N(n-C₅H₁₁)₂ | 1 |
| 8 | —NO₂ | H | H | H |  | —N(n-C₆H₁₃)₂ | 1 |
| 9 | —CF₃ | H | H | H |  | —N(CH₂-thienyl)₂ | 1 |
| 10 | F | H | H | H |  | —N(CH₂-thiacyclohexyl)₂ | 1 |
| 11 | —CF₃ | H | H | H | —CH(n-C₃H₇)₂ |  | 3 |
| 12 | —CH₃ | H | H | H | n-C₄H₉ |  | 3 |
| 13 | —CH=CH—CH=CH— | H | H | n-C₅H₁₁ |  |  | 3 |
| 14 | —C(O)—OH | H | H | H | thienyl |  | 3 |
| 15 | —CF₃ | H | H | H | —(CH₂)₆CH₃ |  | 3 |
| 16 | Cl | Cl | H | H | —CH(CH₃)(thienyl) |  | 3 |
| 17 | Cl | H | H | H |  | —N(pyrrolidine) | 1 |
| 18 | Cl | Cl | Cl | Cl |  | —N(piperidine) | 1 |
| 19 | —NO₂ | H | H | H |  | —N(morpholine) | 1 |
| 20 | H | H | H | H | thienyl |  | 3 |
| 21 | Cl | H | H | H | —CH₂CH=CHCH₃ |  | 3 |
| 22 | —CF₃ | H | H | H | —CH₂C≡CCH₃ |  | 3 |
| 23 | —CH₃ | CH₃ | H | H | —CH₂-phenyl |  | 3 |
| 24 | H | H | H | H | —CH₂-thienyl |  | 3 |
| 25 | —CH₃ | CH₃ | H | H | —CH₃ |  | 3 |
| 26 | —CH₂CH₂CH₂— |  | H | H | —C₂H₅ |  | 3 |

The novel compounds of this invention are uricosuric agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 100, 150, 250 and 500 milligrams of the active ingredient for the symptomatic adjustment of the dosage to the patient to be treated. These dosages are well below the toxic or lethal dose of the products which may be administered in a total daily dosage of from 100 mg. to 2,000 mg. in a pharmaceutically acceptable carrier.

A suitable unit dosage form of the products of this invention can be administered by mixing 50 milligrams of 4-(4-heptylsulfonyl)benzenesulfonic acid or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 2 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form.

EXAMPLE 27

Dry-filled capsules containing 50 mg. of active ingredient per capsule

| | Per capsule, mg. |
|---|---|
| Ammonium 4-(4-heptylsulfonyl)benzenesulfonate | 50 |
| Lactose | 149 |
| Magnesium stearate | 1 |
| Capsule (Size No. 1) | 200 |

The ammonium 4-(4-heptylsulfonyl)benzenesulfonate is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the sulfonylbenzenesulfonic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound selected from the group consisting of compounds of the formula:

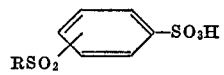

wherein R is alkyl of 6–8 carbon atoms or cycloalkyl, containing 5 to 6 nuclear carbon atoms and the salts thereof with nontoxic pharmaceutically acceptable cations.

References Cited
UNITED STATES PATENTS
3,506,657   4/1970   Hausermann _____ 260—505

OTHER REFERENCES
"Textbook of Organic Chem.," Bernthsen, 1912, p. 404.

Beilstein, 11, II, p. 138.

JOSEPH E. EVANS, Primary Examiner
A. SIEGEL, Assistant Examiner

U.S. Cl. X.R.

260—247.1, 290, 293.85, 326.82, 501.21, 509, 551 R, 556 B, 607 A; 424—248, 263, 267, 274, 303